US 7,373,505 B2

(12) United States Patent
Seltzer et al.

(10) Patent No.: US 7,373,505 B2
(45) Date of Patent: May 13, 2008

(54) DISPLAYING A SECURITY ELEMENT WITH A BROWSER WINDOW

(75) Inventors: Ann Seltzer, Bellingham, WA (US);
Steve Dirickson, Issaquah, WA (US);
Roland Tokumi, Issaquah, WA (US);
Roberto A. Franco, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 10/826,139

(22) Filed: Apr. 15, 2004
(Under 37 CFR 1.47)

(65) Prior Publication Data
US 2005/0235351 A1 Oct. 20, 2005

(51) Int. Cl.
*G06F 9/00* (2006.01)
(52) U.S. Cl. .................. 713/166; 713/151; 713/182
(58) Field of Classification Search ............ 713/166, 713/151, 182
See application file for complete search history.

(56) References Cited

U.S. PATENT DOCUMENTS 6,356,937 B1 3/2002 Montville et al. .......... 709/206

*Primary Examiner*—Thomas R. Peeso
(74) *Attorney, Agent, or Firm*—Merchant & Gould P.C.

(57) ABSTRACT

The present invention provides a method and system for providing a security element that is directed at inhibiting malicious activity by displaying a browser window in such a way that the user can trust and know the source of the window. Additional information and ornamentation is displayed on the window to help ensure that an end user is not confused or misled ("spoofed") into believing that the window originates from a trusted source. When a call is made to open a browser window, the status bar is displayed by default. The status bar provides additional information, such as the security zone, to the user to help the user in determining the source of the content. The security zone informs the user the location from where the content is originating. This additional information helps to ensure that the user has the necessary information on whether or not to trust the source.

17 Claims, 6 Drawing Sheets

DISPLAYING A SECURITY ELEMENT WITH A BROWSER WINDOW

BACKGROUND OF THE INVENTION

Preserving the security of a computer when accessing Internet sites can be difficult. Every day there are new ways of misleading users to select actions they believe will perform a safe task when in actuality performing the task will be malicious. For example, a browser window may be maliciously drawn to imitate a dialog box or a window associated with a trusted source. The user seeing the window may be misled into believing that they are closing the window when they are actually being redirected to another site or downloading a malicious file.

SUMMARY OF THE INVENTION

The present invention is directed at providing a method and system for providing a security element that is directed at inhibiting malicious activity by displaying a browser window in such a way that the user can trust and know the source of the window.

According to one aspect of the invention, the security element includes additional information and ornamentation that is displayed on the window to help ensure that a user is not confused or misled ("spoofed") into believing that the window originates from a trusted source when in actuality the source is a non-trusted source.

According to another aspect of the invention, when a call is made to open a browser window, the security element is a status bar that is displayed by default. The status bar may provide additional information, such as the security zone, to the user to help the user in determining the source of the content. The security zone informs the user the location from where the content is originating.

According to yet another aspect of the invention, the security zone in which the user is navigating is used to determine the security element to be displayed with the browser window. For example, when the source in a non-trusted source, the security element is always shown. When the source is trusted, the security element may or may not be shown.

DETAILED DESCRIPTION OF THE PREFERRED EMBODIMENT

Generally, the present invention is directed at providing a method and system for providing a security feature that is directed at inhibiting malicious activity by displaying a window in such a way that the user can trust and know the source of the window. A security element that includes additional information and ornamentation is displayed on the window to help ensure that an end user is not confused or misled ("spoofed") into believing that the window originates from a trusted source. For example, the user will be able to visually distinguish a window generated from a trusted source, such as the operating system, versus a window having content generated from an non-trusted source, such as an external web site.

According to one embodiment, when a browser window is opened, a status bar is displayed by default. The status bar provides additional information, such as the security zone, to the user to help the user in determining the source of the content. The security zone informs the user the location from where the content is originating. For example, the security zone may indicate the content is originating from the Internet. This additional information helps to ensure that the user has the necessary information on whether or not to trust the source.

Illustrative Operating Environment

Figure 1:
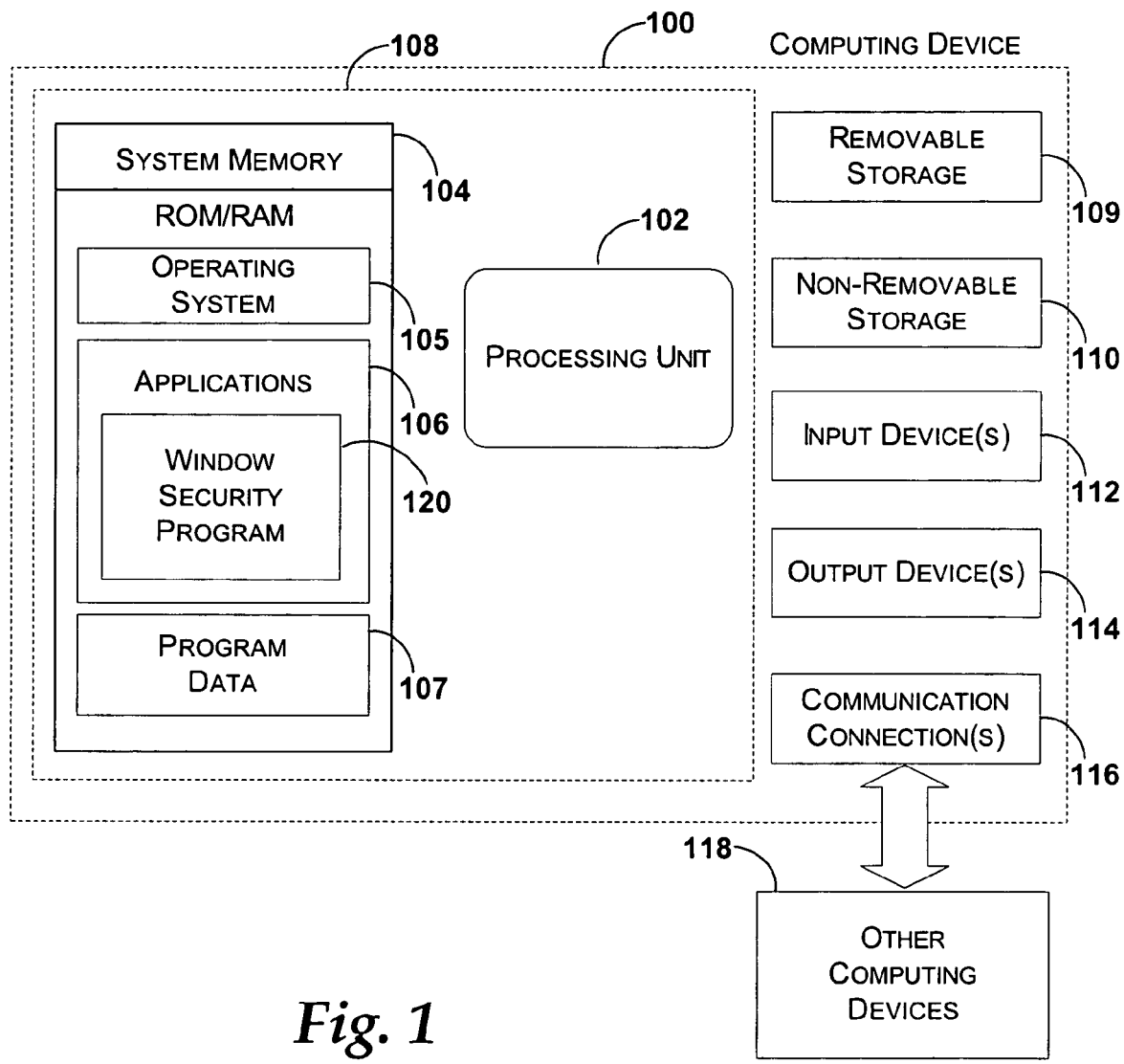
FIG. 1 illustrates an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a windows security program 120. Generally, window security program 120 is configured to ensure that a window is opened with the visual cues and information necessary for a user to determine the source of the content within the window. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network.

Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Windows Including Security Elements

Figure 2:
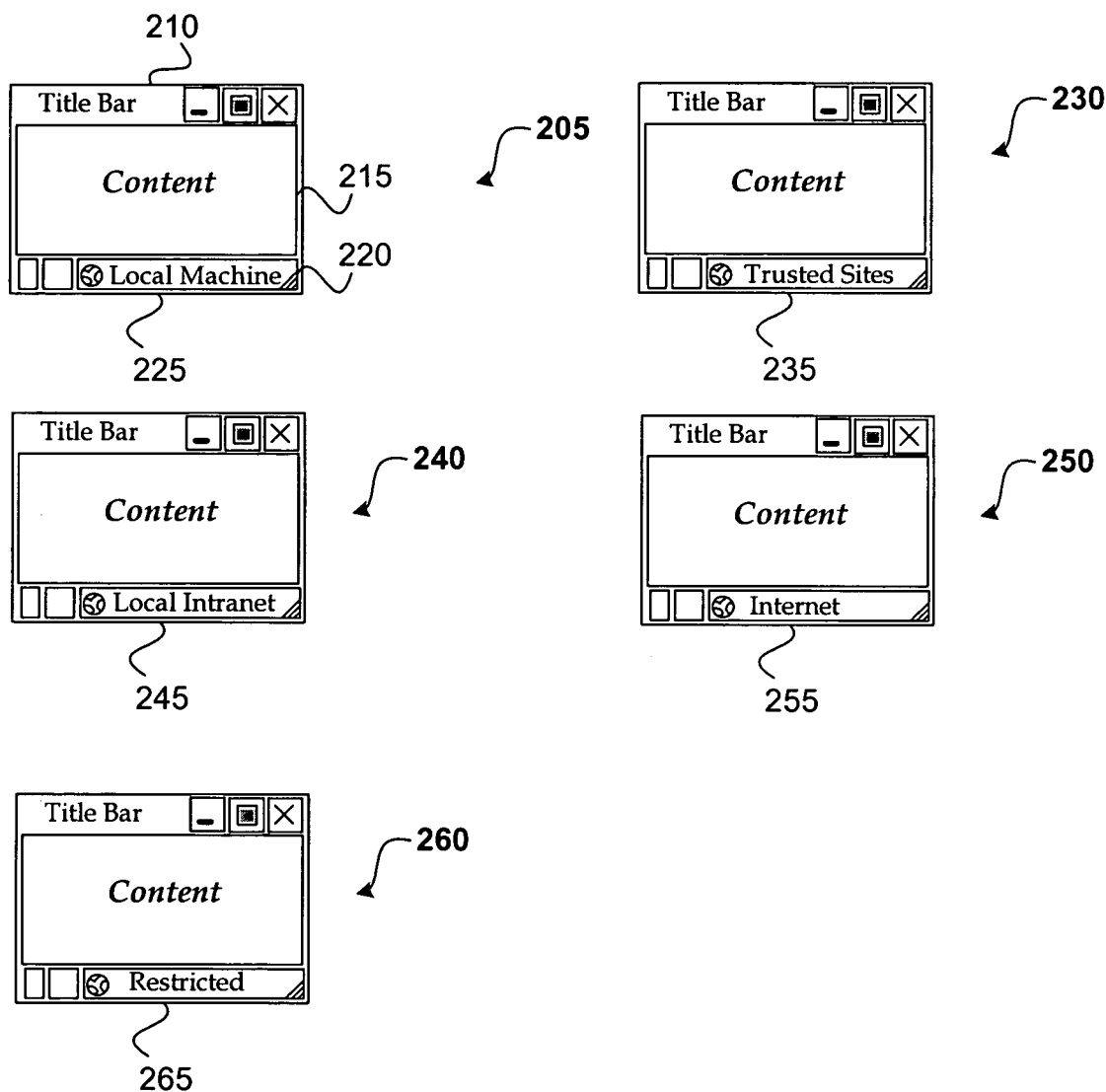
FIG. 2 shows exemplary windows illustrating different zones a user may be accessing.

FIG. 2 shows exemplary windows illustrating different zones a user may be accessing, in accordance with aspects of the invention. Security zones are used to assist in providing an appropriate level of security for the various types of content that users are likely to encounter. Many different security zones may be implemented that have varying degrees of trustworthiness associated with them. According to one embodiment of the invention, there are five different zones, including a local machine zone (205), a trusted sites zone (230), a local intranet zone (240), an Internet zone (250), and a restricted zone (260). The different zones that have varying levels of security associated with them. According to one embodiment of the invention, a security element, such as status bar 220 is always displayed with the window.

The current zone (225, 235, 245, 255, and 265) is displayed on the right hand bottom side of status bar 220. The user can easily assess the risk associated with content 215 by referring to the zone. Whenever a user navigates to a different zone, that zone is displayed within the status bar.

According to one embodiment of the invention, there are default security settings associated with each of the zones. These security settings, however, may be changed and configured to the settings based on the needs of an organization and its users.

For example, an organization can specify settings for the way a browser handles displaying content, downloading programs and files, depending on the zone the content or file are coming from. For example, an organization might be confident that anything downloaded within its corporate intranet is safe. Therefore, security settings for some zones, such as the local machine zone (225) or the Local Intranet zone (245) may be set to a low level allowing downloading with little or no prompting. The security settings for non-trusted sources, however, such as content from the Internet zone or the Restricted sites zone may be much more strict. For example, more information may be displayed to the user indicating the risk associated with the content.

The Local Machine zone illustrated by window 205 is a zone for content that exists on the user's local computer. The content found on the user's computer, except for content that may be cached on the local system from an non-trusted source, is treated with a high level of trust. For example, a browser may cache content from non-trusted sources obtained from the Internet. Generally, any files already on the local computer are assumed to be very safe and therefore, minimal security settings are assigned to them. According to one embodiment, the security element may be turned off when the zone being navigated is the local machine zone.

Web sites may be added and deleted from the Trusted site zone (235) and the Restricted site zone (265). The trusted site zone (235) and the restricted size zone (265) contain sites that are trusted more or less than the sites in the Internet zone or the Local intranet zone.

The trusted sites zone (235) refers to sites that are believed to not be harmful. For example, it is believed that the user may safely download or run files from sites contained within the "trusted sites zone" without worrying about the trustworthiness of the data. This zone is intended for highly trusted sites, such as the sites of trusted business partners. According to one embodiment, the security element may be turned off when the zone being navigated is the trusted sites zone.

The restricted sites zone (265) is for sites that are not trusted and are assigned to a high security level. When a user is at a restricted site, enough information is provided with window 260 such that the user knows the content is from an non-trusted source. According to one embodiment, the status bar (220) and the title bar (210) are always displayed when the user is navigating within a restricted zone.

The local intranet zone (245) typically contains any addresses that don't require a proxy server, as defined by the system administrator. These typically include sites specified by network paths (such as \\computername\foldername), and local intranet sites (typically addresses that don't contain periods, such as http://internal). Local intranet zone 245 can generally be trusted, since the information on the intranet is coming from the user's company. For example, since sites on the user's company's intranet can be trusted, the organization typically wants users to be able to run all types of active content from this location. According to one embodiment of the invention, the title bar (210) and status bar (220) may be turned off when the user is operating within the local intranet zone (245).

The Internet zone (255) consists of the Web sites that are not included on the user's computer, on the company's local intranet, or a site that is not assigned to the trusted sites zone or the restricted sites zone. Sites located on the Internet are generally not as trustworthy. Therefore, a higher level of security is applied to the Internet zone. This higher security level helps users from running active content and downloading code to their computers. When the user has navigated to the Internet zone (255) window 250 will have enough information necessary for the user to know where the content is coming from. For example, according to one embodiment, window 250 includes the title bar (210) and the status bar (220) with the Internet zone (255) indicated within the status bar (220).

Figure 3:
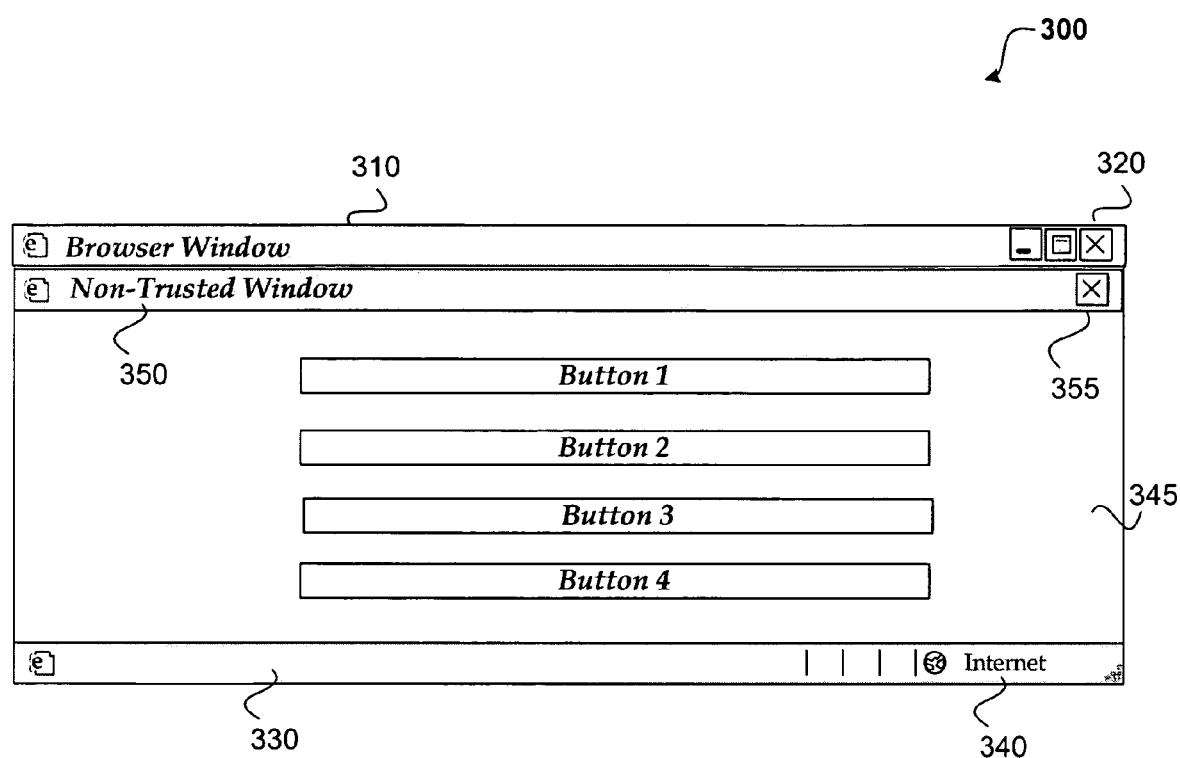
FIG. 3 illustrates non-trusted content displayed within a trusted browser window.

FIG. 3 illustrates non-trusted content displayed within a trusted browser window, in accordance with aspects of the invention.

Trusted browser window 300 includes title bar 310, status bar 330, zone information 340, and non-trusted content 345. Non-trusted content 345 includes title bar 350 with close button 355 that is meant to spoof the user into believing that when they click on close button 355 that browser window 310 will close. According to one embodiment of the invention, any window that is within a zone that is not trusted is displayed with the status bar (330). In the most trusted zones, the browser status bar (330) and the title bar (310) may be turned off. According to another embodiment, the security element(s) may never be turned off.

Content 345 is drawn as an exemplary advertising window. Content 345 is drawn in an attempt to mislead the user into clicking close button 355 within content 345 instead of clicking on close button 320. Clicking close button 355 could be malicious to the user. For instance, when the user clicks fictitious close button 355, instead of closing the window as a browser would do, the user may be navigated to another window, or worse, a virus could be downloaded to the user's computer. Forcing the status bar (330) to be displayed for non-trusted content helps in providing the user with the necessary information to distinguish where the content originates. As can be seen by referring to FIG. 3, content 345 is clearly within a trusted browser window that has the status bar (330) on which clearly informs the user that the window came from an Internet source (340).

Status bar 330 is displayed by default in order to help distinguish windows generated by trusted sources, such as the operating system of the computer, and content generated by non-trusted sources.

Malicious activity is inhibited by displaying additional information and ornamentation on browser window 300 to help ensure that an end user is not confused or misled by content 345. According to one embodiment of the invention, the additional information and ornamentation are visual cues to make content 345 appear to be within a web page window. In the present example, for instance, if status bar 330 was not displayed the user could be led to believe that content 345 is a window created by the operating system instead of an outside source.

When a browser window with a title bar is opened, the status bar is displayed by default in order to ensure that the information in the status bar is visible to the user. The security zone (340) is displayed within the status bar 330 to inform the user, for example, whether they are on the Internet or the Local Intranet.

Figure 4:
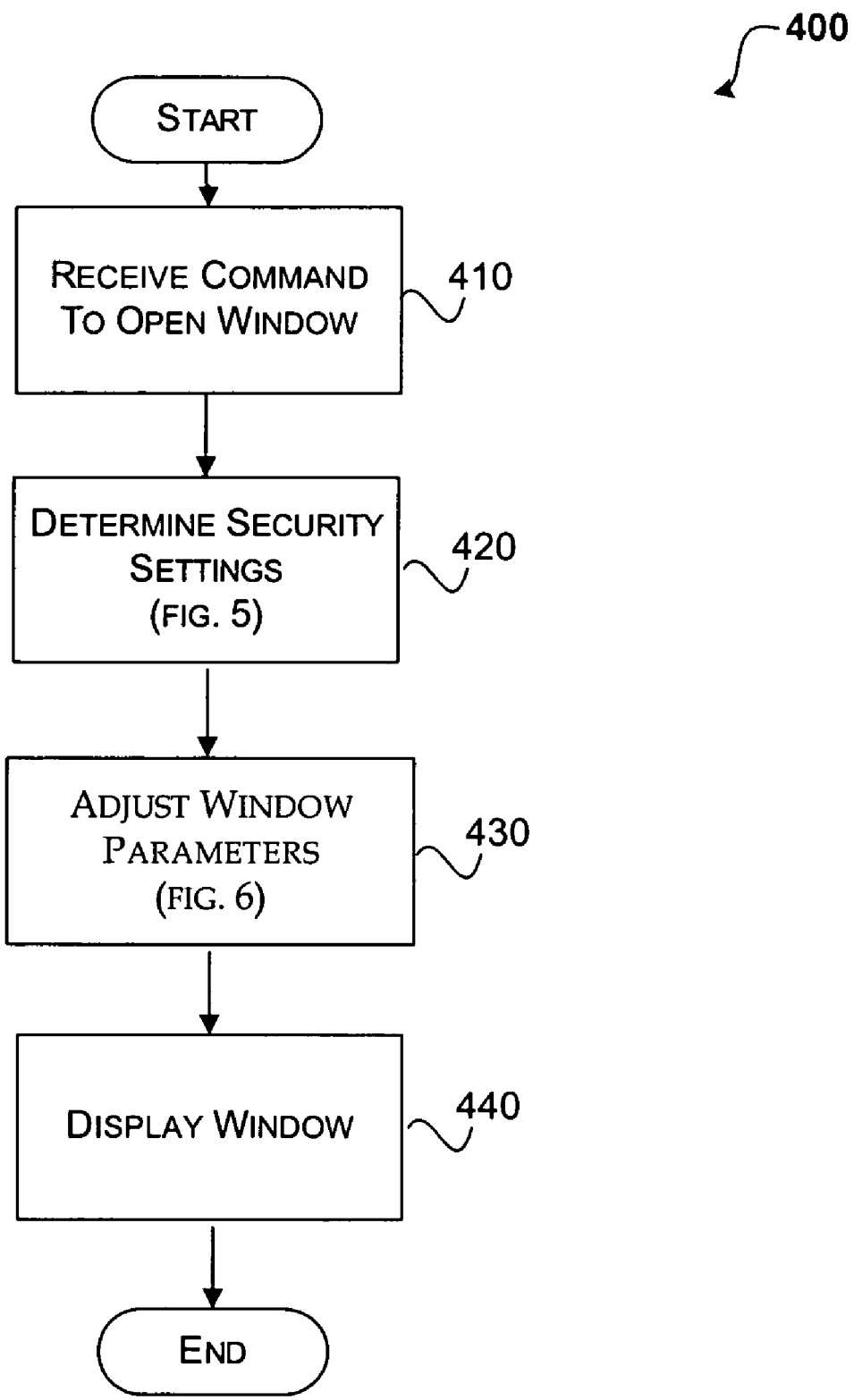
FIG. 4 illustrates a process for improving security for a browser window.

FIG. 4 illustrates a process for improving security for a browser window, in accordance with aspects of the invention. After a start block, the process flows to block 410, where a call is received to open a new window. The call to open the window generally has associated window settings that define the characteristics of the window. These settings generally include information such as height, width, location, scroll bar information, title bar, status bar related information, and the like.

Moving to block 420, the security settings associated with the security zone are determined. Generally, the security settings relate to the zone the user is currently navigating (See FIG. 5 and related discussion). The security settings may be used to determine whether or not display the security element.

Transitioning to block 430, the window settings may be modified based on the security settings. Generally, the parameters are modified such that the window settings are configured such that there is enough information and ornamentation on the window for the user to be able to recognize non-trusted content (See FIG. 6 and related discussion). For example, the status bar is displayed.

Flowing to block 440, the window is displayed. According to one embodiment, the window is displayed with the title bar and status bar on such that the content is clearly distinguishable from the web page window.

Figure 5:
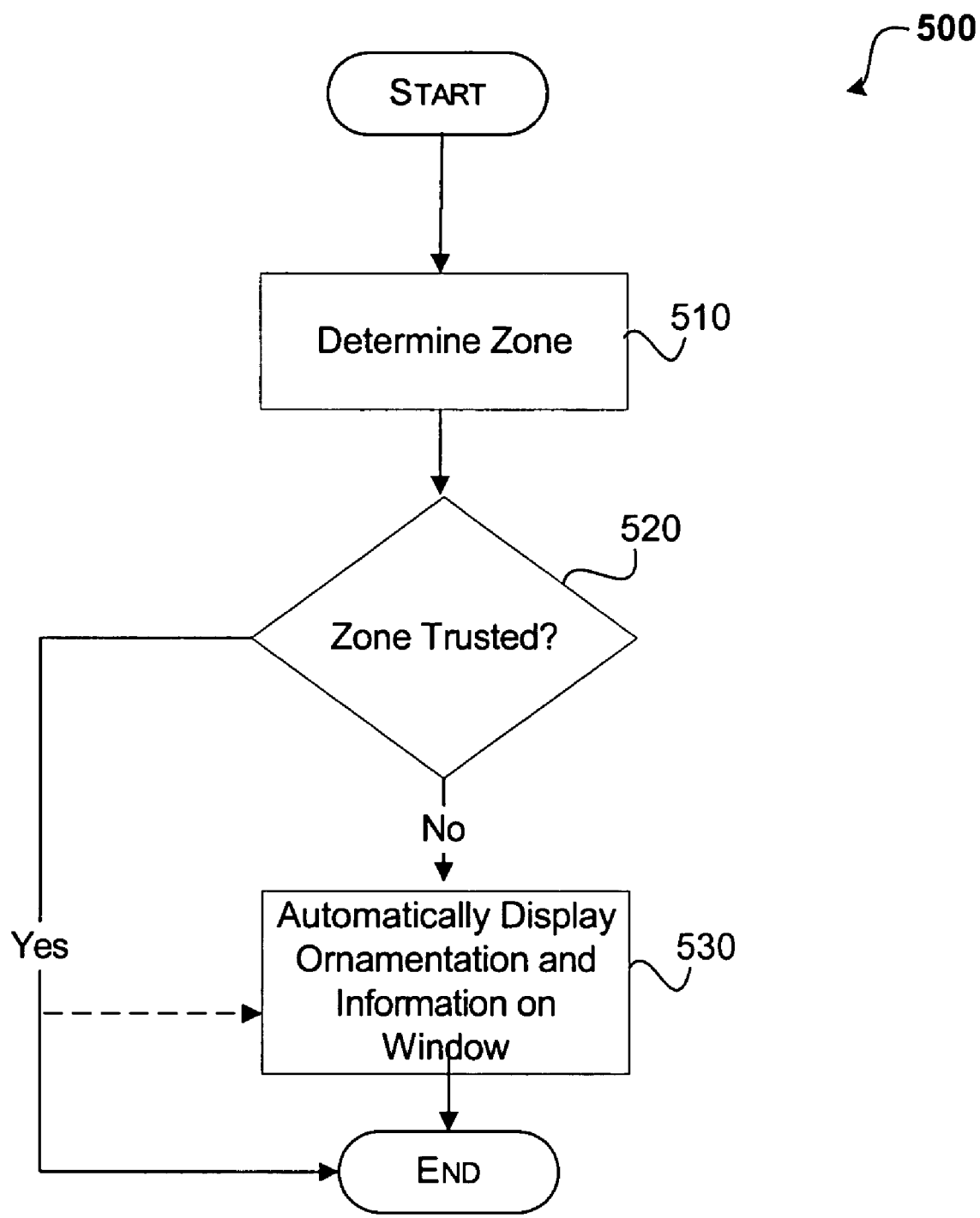
FIG. 5 shows a process for determining security settings.

FIG. 5 shows a process for determining security settings, in accordance with aspects of the invention. After a start block, the process flows to block 510 where the security zone is determined. According to one embodiment, the security zone may be one of five zones including a including a local machine zone, a trusted sites zone, a local intranet zone, an Internet zone, and a restricted zone.

Moving to decision block 520, a determination is made as to whether the zone is trusted. A trusted zone is a zone that is considered to always have trusted content. In other words, the content retrieved from the trusted zone is not malicious. When the zone is not trusted, the process flows to block 530, where the window requested to be opened will include the ornamentation and information necessary for the user to determine that the location of the content is from an non-trusted source. According to one embodiment, the title bar and status bar is displayed for any window that contains content from a non-trusted zone. When the zone is trusted, the process flows to an end block where processing ends. According to another embodiment, even when the zone is trusted the window includes the ornamentation and information necessary for the user to determine that the location of the content is from an non-trusted source. The processing then steps to an end block and returns to processing other actions.

Figure 6:
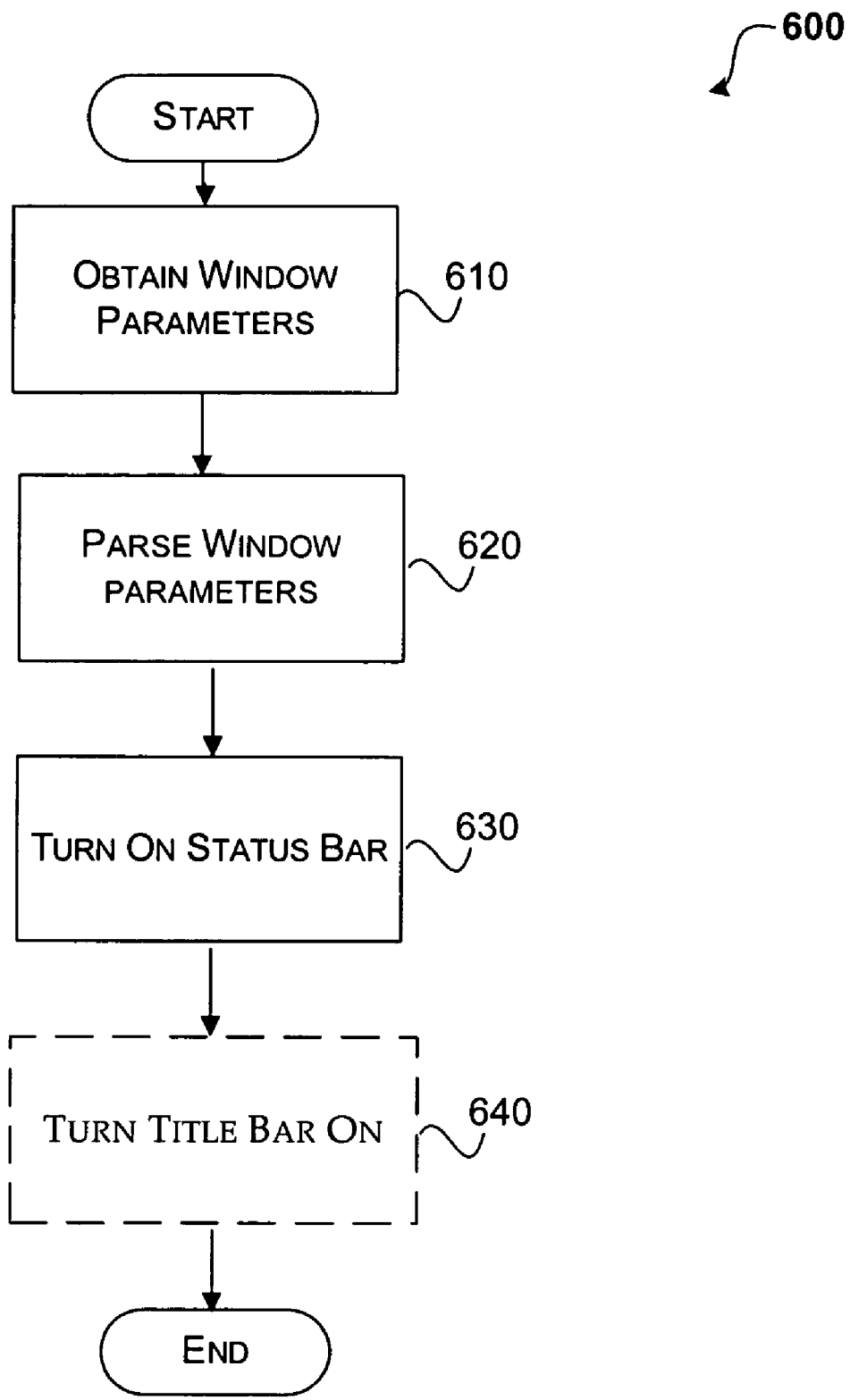
FIG. 6 illustrates a process flow for adjusting window parameters associated with a security element, in accordance with aspects of the invention.

FIG. 6 illustrates a process flow for adjusting window parameters associated with a security element, in accordance with aspects of the invention. After a start block the process flows to block 610 where the window parameters are obtained. As discussed above, the window parameters may relate to any attribute associated with the window, such as: width, height, scroll bar, colors, title bar (on/off), status bar (on/off), and the like.

Transitioning to block 620, the window parameters are parsed to locate attributes relating to the status bar. According to one embodiment, the title bar attributes are also located.

Flowing to block 630, the status bar attribute is set to on. This helps to ensure that the status will be displayed even if the window parameters were set to not display the status bar.

The process may then flow to optional block 640, where the title bar is also turned on. Other attributes or information may also be turned on and displayed to help ensure that the window contains enough ornamentation and information for the user to determine that the content within the window is not a window itself. For example, a special border could be placed around the window. The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a security feature for a browser window, comprising:
   receiving a call to open the window;
   determining a security level associated with the window; wherein the security level is selected from at least one non-trusted security level and at least one trusted security level;
   when the security level indicates that content within the window comes from a non-trusted source displaying the window with a security element that a user may view to determine that the content within the window comes from the non-trusted source;
   examining attributes associated with the call to open the window;
   adjusting at least one of the attributes within the call such that the security element is displayed for the non-trusted security element; and
   sending the modified call to open the window.

2. The method of claim 1, wherein determining the security level associated with the window further comprises determining the security level to be the non-trusted level when the user is navigating in at least one of the following zones: an Internet zone and a restricted zone.

3. The method of claim 1, wherein the security element is a status bar.

4. The method of claim 3, wherein a zone is displayed within the status bar.

5. The method of claim 3, wherein the security element further comprises a title bar.

6. A computer-readable medium having computer-executable instructions for providing a security feature for a browser window, the instructions comprising:
   receiving a call to open the window, wherein the call includes parameters associated with attributes of the window;
   parsing the parameters to locate at least one parameter associated with a security element that when displayed with the window indicates to the user that content within the window comes from a non-trusted source;
   adjusting the at least one located parameters such that the security element is displayed when the window is open;
   determining a security level associated with the window; and
   when the security level indicates that content within the window comes from the non-trusted source adjusting the at least one located parameter.

7. The computer-readable medium of claim 6, wherein the security level is selected from at least one non-trusted security level and at least one trusted security level.

8. The computer-readable medium of claim 6, wherein determining the security level associated with the window further comprises determining the security level to be the non-trusted level when the user is navigating in at least one of the following zones: an Internet zone and a restricted zone.

9. The computer-readable medium of claim 8, wherein the security element is a status bar.

10. The computer-readable medium of claim 9, wherein a zone is displayed within the status bar.

11. The computer-readable medium of claim 9, wherein the security element further comprises a title bar.

12. An apparatus for providing a security feature for a browser window, comprising:
   a processor and a computer-readable medium;
   an operating environment stored on the computer-readable medium and executing on the processor;
   a display; and
   an application operating under the control of the operating environment and operative to perform actions, including:
     receiving a call to open the window, wherein the call includes a parameter associated with a status bar; and
     adjusting the parameter associated with the status bar such that the status bar is displayed when the window is open.

13. The apparatus of claim 12, further comprising:
   determining a security level associated with the window; and
   when the security level indicates that content within the window comes from a non-trusted source adjusting the parameter associated with the status bar.

14. The apparatus of claim 13, wherein the security level is selected from at least one non-trusted security level and at least one trusted security level.

15. The apparatus of claim 14, wherein determining the security level associated with the window further comprises determining the security level to be the non-trusted level when the user is navigating in at least one of the following zones: an Internet zone and a restricted zone.

16. The apparatus of claim 13, wherein a zone is displayed within the status bar.

17. The apparatus of claim 13, further comprising displaying a title bar.

* * * * *